United States Patent [19]
Bell

[11] Patent Number: 5,222,711
[45] Date of Patent: Jun. 29, 1993

[54] BATTERY HOLD-DOWN

[76] Inventor: Stuart D. Bell, R.R. 2, Box 217B, Camp Point, Ill. 62320

[21] Appl. No.: 826,400

[22] Filed: Jan. 27, 1992

[51] Int. Cl.$^5$ .............................................. F16M 13/00
[52] U.S. Cl. .................... 248/503; 180/68.5
[58] Field of Search ............... 248/503, 499, 505, 507, 248/508, 510; 180/68.5

[56] References Cited

U.S. PATENT DOCUMENTS

| | | | |
|---|---|---|---|
| 2,849,074 | 8/1958 | Key et al. | 180/68.5 |
| 2,981,352 | 4/1961 | Jilbert | 180/68.5 |
| 2,994,395 | 8/1961 | Hall | 180/68.5 |
| 3,033,304 | 5/1962 | Kramer | 180/68.5 |
| 3,557,895 | 1/1971 | Thomas | 180/68.5 |
| 3,866,704 | 2/1975 | Bowers et al. | 248/503 X |
| 3,894,607 | 7/1975 | Brock | 248/503 X |
| 4,327,809 | 5/1982 | Fenstormaker | 248/503 X |
| 4,520,887 | 6/1985 | DiFazio | 248/503 X |
| 5,086,860 | 2/1992 | Francis et al. | 248/503 X |

FOREIGN PATENT DOCUMENTS 106157  5/1988  Japan .................................. 248/503

Primary Examiner—David L. Talbott
Attorney, Agent, or Firm—Litman, McMahon & Brown

[57] ABSTRACT

A battery hold-down apparatus includes a generally rectangular frame constructed from a single strip of metal angle material. A battery clamp comprising two separable members is attached to said frame with one of the clamp members comprising a U shaped rigid rod which extends up from one side of the frame, over the battery and downward and ends in an eyelet extending away from the battery. The other clamp member extends upward from the opposite side of the frame and through the eyelet with the clamp being tightened by a wing nut threaded onto the upper end of the second clamp member. Each of the clamp members can be constructed from a single steel rod with each clamp member being pivotable relative to the frame. The apparatus is readily adaptable to multiple battery installations.

9 Claims, 1 Drawing Sheet

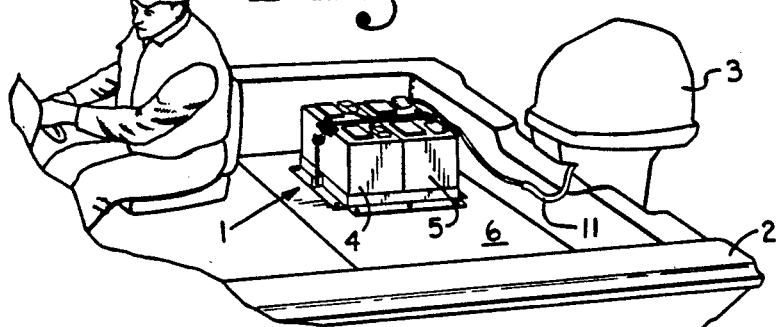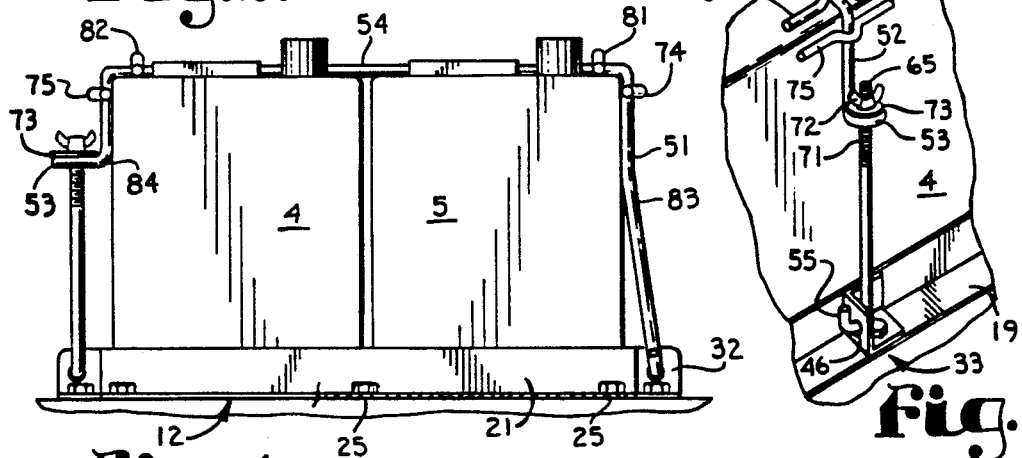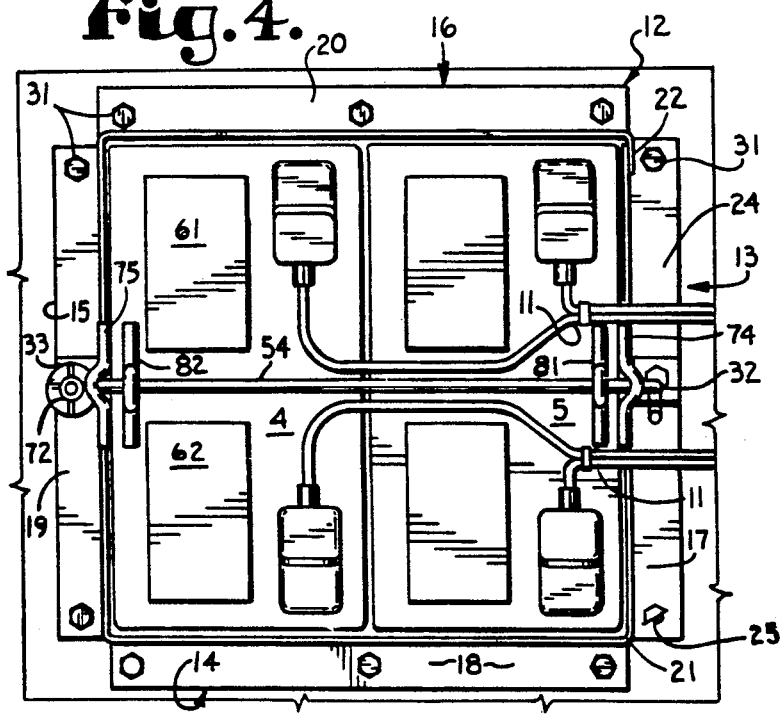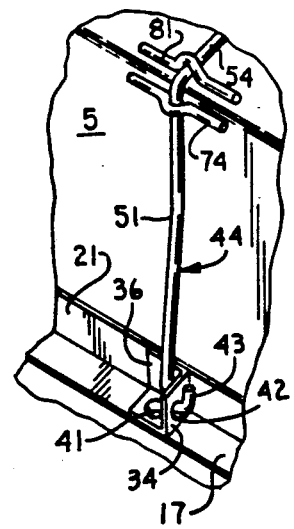

BATTERY HOLD-DOWN

BACKGROUND OF THE INVENTION

The present invention relates to an apparatus for holding and securing a rechargeable storage battery or a pair of batteries in position in a vehicle.

It is well known that acid-based rechargeable storage batteries, of the type used in automobiles and boats, must be reliably secured to the vehicle to prevent them from overturning or shifting. The acid solutions used in such batteries are highly corrosive and can be extremely damaging to both the vehicle structure and the operator. Furthermore, the battery can become a deadly flying object in accidents if it is not securely held to the vehicle structure. In the past, a wide variety of battery hold-down devices have been developed to secure such batteries.

One approach has been to use a plastic housing with a removable lid which completely envelopes a battery. Such housings have proven to be unduly expensive and are difficult to secure to the vehicle. The removable lids have proven to be unsatisfactory as well and access to, installation and removal of batteries from such housings is difficult.

Other battery hold-down devices have utilized single plastic or metal frames or trays which include a well in which the battery sits. A securing strap or clamp is then placed over the battery and attached to the frame or tray. While these arrangements have proven to be generally satisfactory, in the case of plastic frames or trays, they have been subject to breakage. In addition, with respect to both plastic and metal frames or trays, the holding clamps or straps have been unduly complex and have numerous separate parts which are subject to breakage and/or loss.

In addition, in vehicles which present greater than normal electrical loads, such as boats with electric trolling motors, trucks with diesel engines and motor homes, two or more batteries are often mounted in parallel. Prior art battery hold-down devices have not generally been adaptable to such multiple battery installations.

It is clear then that a need exists for a battery hold-down apparatus which securely and reliably holds a battery in position in a motor vehicle. Such an apparatus should be strong, durable and should be equipped with a clamping mechanism which is simple to operate and which includes a minimal number of separable parts. In addition, such an apparatus should be readily adaptable to multiple battery installations.

SUMMARY OF THE INVENTION

The present invention is a battery hold-down apparatus for use in a vehicle such as a boat or truck. The apparatus includes a metal frame which can be constructed from a single continuous strip of steel angle material. The strip of angle material is cut and bent at three right angles at appropriate locations and has its two ends joined together to form a generally rectangular shape. A vertical angle portion of the frame is continuous while a horizontal angle portion is cut at each corner to permit the angle material to be bent into the rectangular shape and to form four distinct legs for supporting the frame. The horizontal support legs can be pre-drilled to accommodate screws to attach the frame to the vehicle.

The frame is pre-sized to snugly accommodate one or two standard storage batteries within a well wherein the perimeter of the well is defined and surrounded by the vertical angle portion of the frame. A pair of clamp holders are attached to the frame, a first of the holders being attached to a first side of the frame and the second clamp holder being attached to a second, opposite side of the frame. A clamp comprising two separable members is attached to the clamp holders, one member to each holder. The first clamp member is constructed from a single steel rod which is bent to form a "U" shape, the center leg of which extends over the battery or batteries generally across the top thereof so as to bisect each battery.

One outside leg of the U is longer than the other and the longer leg is attached to the first clamp holder via a hook formed in the end of the longer leg. The shorter outside leg is bent to form an eyelet. The second clamp member is also constructed from a single rod which is bent at one end to form a hook and is threaded at the other end. The hook end of the second clamp member is attached to the second clamp holder and the threaded end is inserted into the eyelet in the shorter outside leg of the first clamp member.

A wing nut is threaded onto the threaded end of the second clamp member and acts to tension the center leg of the first clamp member against the top of the battery(ies) as the wing nut is tightened onto the second clamp member, thus securely holding the battery(ies) in place. Preferably a pair of crossbars are welded or otherwise attached to the outside legs of the U-shaped clamp member to more securely hold the battery(ies) in place and an additional pair of top crossbars are welded to the center leg of the U-shaped clamp member, which extends across the tops of both batteries, the top crossbars also acting to prevent pairs of batteries from tilting relative to one another.

PRINCIPAL OBJECTS AND ADVANTAGES OF THE INVENTION

The principal objects of the invention are: to provide an improved battery hold-down apparatus for securely clamping one or more electrical storage batteries to a vehicle; to provide such an apparatus which includes a generally rectangular frame constructed from a single strip of metal angle material; to provide such an apparatus in which the rectangular frame is securely anchored to the vehicle; to provide such an apparatus in which a clamp comprising two separable members is attached to the frame, one member to one side and the other member to the opposite side; to provide such an apparatus in which one member of the clamp is a U-shaped steel rod with one outside leg of the U being longer than the other, the center leg of the U being rigid with the outside legs and extending over a battery or batteries held in place by said frame; to provide such an apparatus in which the other member of the clamp is a rod with a threaded end portion which extends through fastening means, such as an eyelet formed in the shorter outside leg of the first clamp member; to provide such an apparatus in which the two clamp members are pivotable with respect to the frame to facilitate access to and installation and removal of the battery or batteries relative to said frame; to provide such an apparatus which is easily adaptable by simple modification in construction to single or multiple battery installations; to provide such an apparatus which is economical to manufacture, is strong and durable, and is light and easily transportable; and to provide such an apparatus which is particularly well adapted for its intended purpose.

Other principal objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a battery hold-down apparatus in accordance with the present invention, and a fragmentary view of a motor boat in which the apparatus is installed with a pair of batteries.

FIG. 2 is an enlarged side elevational view of the battery hold-down apparatus with a pair of storage batteries clamped therein.

FIG. 3 is a fragmentary, perspective view of one side of the battery hold-down apparatus with a battery, showing details of a threaded connection between a pair of clamp members and the attachment of a first clamp member to the frame.

FIG. 4 is an enlarged top plan view of the battery hold-down apparatus, again with a pair of storage batteries clamped therein.

FIG. 5 is a fragmentary, perspective view of the battery hold-down apparatus with a battery, from the side opposite that of FIG. 3, showing details of the attachment of a second clamp member to the frame and the attachment of the crossbars to the clamp.

FIG. 6 is a top plan view of a modified battery hold-down apparatus shown in conjunction with a single battery.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIG. 1, a battery hold-down apparatus in accordance with the present invention is generally designated by the numeral 1. The hold-down apparatus 1 is shown installed on and secured to the floor 6 of a boat 2 equipped with a motor 3. A pair of electrical storage batteries 4 and 5 are clamped in the apparatus 1. The boat 2 can be equipped with an auxiliary electric trolling motor (not shown), thus requiring the additional electrical capacity of a second battery. An electrical lead 11 connects the batteries 4 and 5 to the motor 3. The apparatus 1 will now be more particularly described with reference to the remaining FIGS. 2 through 5.

The hold-down apparatus 1 comprises a generally rectangular frame 12, which may be constructed from a single strip of metal angle material,(for example steel or aluminum) bent (at three different spaced locations so as to firm sections perpendicular to adjacent section) so as to form four sides 13 through 16 of the rectangular frame 12. A vertical side or angle portion 21 is continuous around the frame 12, with ends 22 and 23 of the vertical angle portion 21 overlapping each other and being attached to each other via welding or the like. A horizontal side or angle portion 24 is cut at each corner to permit the metal angle strip to be bent into the rectangular shape of the metal angle frame 12 and to form four distinct support legs 17 through 20. The horizontal support legs 17 through 20 are pre-drilled with a plurality of bores 25 to permit the attachment of the frame 12 to a vehicle, such as the boat 2 in FIG. 1, with a like plurality of screws 31.

A pair of clamp holders 32 and 33 are attached to the opposite sides 13 and 15, respectively, of the frame 12. The clamp holder 32 is best illustrated in FIG. 5. The clamp holder 32 comprises three sides 34, 35 and 36, which are integral with each other, are arranged perpendicular to each other and are fixedly positioned relative to each other. The clamp holder 32 can be constructed from a short piece of metal angle material with a third side attached via welding or the like. The side 35 is attached to the horizontal support leg 17 and the side 36 is attached to the vertical angle leg 21, again via welding or the like. The side 35 has a pre-drilled bore 41 aligned with one of the bores 25 in the horizontal support leg 17 to accommodate one of the screws 31.

The side 34 has another bore 42 pre-drilled therethrough to accommodate a hook end 43 of a first battery clamp member 44. The first clamp member 44 and a second clamp member 45 cooperate to clamp the batteries 4 and 5 in position within the frame 12. The first clamp member 44 is U-shaped and can be made from a single steel rod. The two outside legs 51 and 52 of the clamp member 44 are of different lengths, with the end of the longer leg 51 bent to form a hook 43. The shorter leg 52 (FIG. 3) is bent to form an eyelet 53. The center leg 54 of the clamp member 44 is rigid with and connects the outside legs 51 and 52 and is sized to extend laterally across the tops of the batteries 4 and 5 between cell caps 61 and 62 and terminals 63 and 64. The second clamp member 45 comprises a shorter steel rod which is bent at one end to form a hook 55 which is attached through a bore 46 to the clamp holder 33.

The clamp holder 33 is a mirror image of the clamp holder 32 and will not be further described. The other end 65 of the second clamp member 45 has threads 71 which accommodate a matching threaded wing nut 72. The threaded end 65 of the second clamp member 45 extends through the eyelet 53 of the first clamp member 44 and the wing nut 72 is tightened on the second clamp member 45, urging the eyelet 53 and the rigidly connected center leg 54 downward to securely clamp the batteries 4 and 5 within the frame 12. An optional washer 73 can be used with the wing nut 72 to distribute pressure on the eyelet 53. The wing nut 72 can be equipped with a nylon bushing on the threads to prevent it from backing off under pressure or vibration.

A pair of side crossbars 74 and 75 are attached to the outside legs 51 and 52, respectively, of the first clamp member 44. The crossbars 74 and 75 can be constructed from short pieces of steel rod or the like which are bent to wrap around the legs 51 and 52 and are welded thereto so as to be fixedly attached and extend generally perpendicularly from the legs 51 and 52. An additional pair of top crossbars 81 and 82 are attached by welding to the center leg 54 of the first clamp member 44 so as to be fixedly attached to and extend perpendicularly therefrom. The top crossbars 81 and 82 are identical to the side crossbars 74 and 75. The position of the top crossbars 81 and 82 prevents the batteries 4 and 5 from tipping relative to each other.

Referring again to FIG. 2, the offset between the sides of the batteries 4 and 5 and the clamp holders 33 and 32, respectively, is accommodated by the shape of the first clamp member 44. More specifically, in the case of the clamp holder 32, the side leg 51 is bent outward at a location designated by reference numeral 83. In the case of the clamp holder 33, the eyelet 53 is formed at approximately a ninety degree angle away from the battery at a location designated by reference numeral 84 in the leg 52.

In FIG. 6, a modified battery hold-down apparatus 101 for use with a single battery 102 is illustrated. The apparatus 101 differs from the hold down apparatus 1 only in certain ways which are discussed below, so that reference is made to the first embodiment for common general details of the apparatus 101. Accordingly, common portions of the hold-down apparatus 101 not pertinent to these differences have not been renumbered herein nor are such portions discussed again in detail. Side crossbars 174 and 175 are attached to outside legs 151 and 152, respectively, of first clamp member 144 in the apparatus 101. First clamp member 144 and a second clamp member 145 are connected to a frame 103.

In operation, the hold-down apparatus 1 (or 101) is anchored to a vehicle, such as the boat 2, via the screws 31. The pair of batteries 4 and 5 are then positioned within the housing 12 and the clamp members 44 and 45 are inserted into the bores 42 and 46, respectively, in the clamp holders 32 and 33. The first clamp member 44 is then placed over the batteries 4 and 5 and the threaded end 65 of the second clamp member 45 is inserted through the eyelet 53 in the first clamp member 44. The washer 73 and the wing nut 72 are then placed on the threaded end 65 of the second clamp member 45 and the wing nut 72 is tightened to securely clamp the batteries 4 and 5 in position. Removal of the batteries 4 and 5 from the hold-down apparatus 1 is particularly easy since the bores 42 and 46 in the clamp holders 32 and 33, respectively, are somewhat oversized, thus allowing the clamp members 44 and 45 to be easily pivoted to either side once the wing nut 72 is loosened.

The hold-down apparatus 1 can be constructed, for example, from cold rolled steel angle strips for the frame 12 and stainless steel rods for the clamp members 44 and 45 as well as the crossbars 74, 75, 81 and 82. Attachment of the crossbars 74, 75, 81 and 82 to the first clamp member 44, attachment of the clamp holders 32 and 33 to the frame 12, and attachment of the overlapping ends 22 and 23 of the vertical angle portion 21 are preferably accomplished by welding. It is contemplated that other materials and attachment techniques could be employed with equal success.

While the apparatus 1 has been illustrated in an open well in the boat 2, it should be noted that it would function equally well in a closed battery compartment or under the hood of a car or truck, etc. Furthermore, while the first clamp member has been described as U shaped, it could be L shaped as well, with a straight extension from a top leg cooperating with the second clamp member. While one and two battery embodiments have been illustrated and described, the hold-down apparatus 1 is readily adaptable to installations requiring three or more batteries.

It is also foreseen that the two clamp members shown in the illustrated embodiments could be joined by fastening means other than in the illustrated threaded rod and wing nut. For example, a turnbuckle could be substituted for this purpose.

It is to be understood that while certain forms of the present invention have been illustrated and described herein, it is not to be limited to the specific forms or arrangement of parts described and shown.

What is claimed and desired to be secured by Letters Patent is as follows:

1. A battery hold-down apparatus comprising:
   (a) a frame for positioning about the base of a battery and being adapted to be secured to a vehicle;
   (b) a clamp comprising first and second separable members; said first member being attached to a first side of said frame and said second member being attached to a second side of said frame opposite to said first side; said first clamp member being U-shaped and adapted to extend up one side, over the top, and partially down the opposite side of the battery and said second clamp member cooperating with said first member to clamp the battery in place within said frame;
   (c) said first clamp member further comprising a rigid and generally U-shaped rod with an eyelet at one end of a first outside leg of the U-shaped rod, said first outside leg being adapted to extend partially down one side of the battery, a center leg of said U-shaped rod that is adapted to extend over the top of the battery and a second outside leg of the U-shaped rod being pivotally connected to said frame first side;
   (d) said second clamp member comprises a rod with threads at one end;
   (e) said threaded end of said second clamp member extends through said eyelet on said first clamp member and forms said fastening means therewith; and
   (f) fastening means for releasably and securely joining said first and second clamp members;
   (g) retaining means threaded onto said threaded end of said second clamp member such that the center leg of said U-shaped rod of said first clamp member is adapted to be urged against a top of the battery as said retaining means is tightened onto said second clamp member.

2. The apparatus of claim 1, wherein:
   (a) a pair of side crossbars are attached to the said first and second outside legs of said first clamp member respectively near said center leg and being adapted to help secure the battery in place.

3. The apparatus of claim 1, including:
   (a) a pair of batteries arranged side-by-side in said frame;
   (b) the center leg of said first clamp member extends over the tops of both of said batteries; and
   (c) a pair of top crossbars are attached to the center leg of said first clamp member near opposite ends of the center leg and are to help prevent said batteries from tipping relative to each other.

4. A battery hold-down apparatus, comprising:
   (a) a generally rectangular frame constructed from a single strip of metal angle material, a horizontal portion of said strip being cut at the corners of said frame, resulting in four support sections for said frame, a vertical portion of said strip being generally continuous about the periphery of said frame for holding at least one battery therein;

(b) a clamp having first and second separable members; said first of said clamp members comprising a U-shaped rod, said U-shaped rod having two side legs connected by a center leg, a first of said side legs having an eyelet at the end thereof, said first side leg being adapted to extend partially down one side of said battery, the second side leg including a hook at the end thereof, said second side leg being adapted to extend along the opposite side of said battery from said first side leg, the center leg of said U-shaped rod adapted to extend across the top of the battery;

(c) a second clamp member comprising a rod with threads at one end and a hook at the other end;

(d) first and second clamp holders attached to opposite first and second sides of said frame, respectively, each of said first and second clamp holders including a bore drilled therethrough;

(e) the hook ends of said first and second clamp members pivotally joined with said bores in said first and second clamp holders, respectively, to attach said clamp members to said frame;

(f) said threaded end of said second clamp member extending through said eyelet end of said first clamp member; and (g) retaining means threaded onto said threaded end of said second clamp member, said center leg of said first clamp member adapted to be urged against a top of the battery as said retaining member is tightened onto said second clamp member.

5. The apparatus of claim 4, wherein:
(a) said bores are oversized with respect to said hooks to allow said clamp members to pivot about said clamp holders.

6. The apparatus according to claim 4, including:
(a) a pair of batteries arranged side-by-side in said frame;

(b) a pair of side crossbars attached to said the side legs of said U-shaped rod near said center leg of said first clamp member to secure said batteries in place in said frame; and (c) a pair of top crossbars are attached to the center leg of said U-shaped rod of said first clamp member near opposite ends of said center leg to prevent said batteries from tipping relative to each other.

7. The apparatus of claim 4, wherein:
(a) said support legs are predrilled to be adapted to facilitate the attachment of said frame to a vehicle via screws or the like.

8. The apparatus according to claim 6, including:
(a) a boat; and wherein
(b) said frame is attached to said boat.

9. A battery hold-down apparatus comprising:
(a) a clamp comprising first and second separable members; said first member having a "U" shaped portion with a pair of side legs connected by a center leg, a first of said side legs extending along one side of a battery and terminating in a first securing means for securing said clamp to a vehicle holding said battery; said center leg being rigid with said first side leg and being adapted to extend over the top of said battery; the second side leg being rigid with said center leg and being adapted to partially extend along the opposite side of said battery from said first side leg to clamp the battery in place;

(b) said second clamp member includes second securing means to secure said second clamp member to the vehicle opposite said first means; a first of said first and second clamp members including fastening means cooperating with an eyelet formed on a second of said first and second clamp members to be adapted to urge said top leg of said first clamp member against the battery top as said fastening means is tightened.

* * * * *